United States Patent [19]
Fischer

[11] 3,888,655
[45] June 10, 1975

[54] SYNERGISTIC HERBICIDAL MIXTURE

[75] Inventor: Adolf Fischer, Mutterstadt, Germany

[73] Assignee: Badische Anilin- Soda-Fabrik Aktiengesellschaft, Ludwigshafen/Rhine, Germany

[22] Filed: Mar. 22, 1973

[21] Appl. No.: 343,629

[30] Foreign Application Priority Data
Apr. 13, 1972 Germany............................ 2217722

[52] U.S. Cl. ............................. 71/91; 71/88; 71/90; 71/94; 71/97; 71/103; 71/105; 71/106; 71/111; 71/114; 71/115; 71/121; 71/124
[51] Int. Cl. .............................................. A01n 9/12
[58] Field of Search ................................. 71/91, 105

[56] References Cited
UNITED STATES PATENTS

| | | | |
|---|---|---|---|
| 3,027,248 | 3/1962 | Koopman et al. | 71/105 |
| 3,708,277 | 1/1973 | Zeidler et al. | 71/91 |

OTHER PUBLICATIONS

Fischer, "Herbicidal Compositions," (1970), CA73, No. 119534z, (1970).
De Floor, "Control of Chrysanthemum Segetum etc.," (1971), CA77, No. 44194k, (1972).

*Primary Examiner*—Glennon H. Hollrah
*Attorney, Agent, or Firm*—Johnston, Keil, Thompson & Shurtleff

[57] ABSTRACT

New and valuable herbicide comprising a composition of several active ingredients.

4 Claims, No Drawings

SYNERGISTIC HERBICIDAL MIXTURE

The present invention relates to a herbicide comprising a composition of several active ingredients.

It is known that substituted phenyl ethers, carbamates, terephthalates, acid amides, benzoic acids, fluorenecarboxylic acids and benzothiadiazinones have a herbicidal action. However, this action is poor.

I have now found that a composition of
a. a compound of the formula

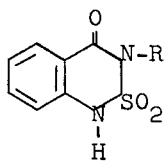

where R denotes lower alkyl of a maximum of 4 carbon atoms, or its salts, such as alkali metal, alkaline earth metal, ammonium, hydroxyalkylammonium, alkylammonium and hydrazine salts, e.g. salts with sodium, lithium, potassium, calcium, iron, methylammonium, trimethylammonium, ethylammonium, diethanolammonium, ethanolammonium, dimethylamine, dimethylethanolamine, hydrazine and phenylhydrazine, and
b. a compound of the formula

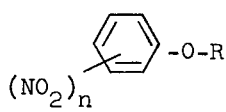

where $n$ denotes one of the integers 1 and 2, and R denotes phenyl which may be substituted by halogen or trifluoromethyl or R denotes the radical

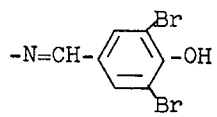

or
c. a compound of the formula

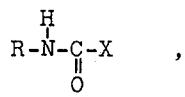

where R denotes methoxy, alkynyl of 5 carbon atoms or a 5-chloro-4-methylthiazolyl radical and X denotes phenoxymethyl bearing halogen and methyl substituents in the phenyl radical, dichlorophenyl, or lower alkyl, or
d. a compound of the formula

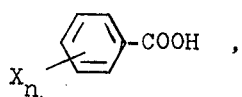

where X denotes halogen, methoxy or amino and $n$ denotes one of the integers 1, 2, 3 and 4, it being possible for methoxy and halogen or amino and halogen or methoxy, amino and halogen to be present simultaneously, or
e. a compound of the formula

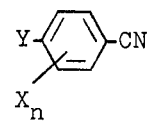

where Y denotes hydrogen, hydroxy or the radical

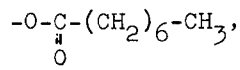

X denotes halogen and n denotes the integer 2, or
f. a compound of the formula

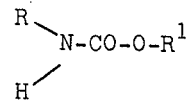

where R denotes halophenyl or aminobenzenesulfonyl and $R^1$ denotes lower alkyl or haloalkynyl of 4 carbon atoms, or
g. 9-hydroxyfluoroenecarboxylic acid-(9), or
h. O,S-dimethyltetrachlorothioterephthalate, or
i. a compound of the formula

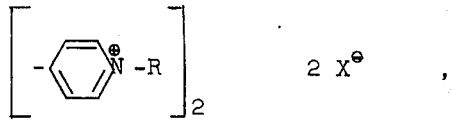

where R denotes methyl, the radical $-CH_2CON(C_2H_5)_2$ or the radical

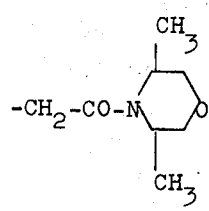

and X denotes an anion ($Cl^-$, $Br^-$, methyl sulfate), or
k. the compound 1,1'-ethylene-2,2-dipyridilium dibromide, have a herbicidal action superior to that of their individual components.

Active ingredients a to k may be applied in amount of 0.5 to 5 kg per hectare.

The weight ratio of $a : b, c, d, e, f, g, h, i,$ or $k$ is from 5:1 to 1:5, preferably from 3:1 to 1:3.

The compositions of the invention are suitable for controlling unwanted plants, e.g. dicotyledonous seed weeds, monocotyledonous grassy seed weeds and Cyperaceae in crops such as cereals, rice, soybeans, Indian corn, potatoes, peas, and beans.

The compositions may be used pre- and/or postemergence.

The agents according to the invention may be used as solutions, emulsions, suspensions oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared form emulsion concentrates, pastes or wettable powders by adding water. To prepare emulsions the ingredients as such as dissolved in a solvent may be homogenized in water III + V  0.75 + 0.75 kg per hectare;
IV + V  1.0 + 2.0 kg per hectare.

After 8 to 12 days it was ascertained that the compositions had a better overall action than the individual active ingredients, combined with good crop plant compatibility. The results are given below:

| Active ingredient kg/ha | I 1 | I 2 | II 2 | II 3 | III 0.75 | III 1.5 | IV 1 | IV 3 | V 0.75 | V 1 | V 1.5 | V 2 | V 3 | I+V 1+1 | II+V 2+1 | III+V 0.75+0.75 | IV+V 1+2 |
|---|---|---|---|---|---|---|---|---|---|---|---|---|---|---|---|---|---|
| Triticum aestivum | 0 | 0 | 10 | 20 | 0 | 10 | 0 | 0 | 0 | 0 | 0 | 0 | 0 | 0 | 10 | 0 | 0 |
| Hordeum vulgare | 0 | 0 | 10 | 20 | 5 | 15 | 0 | 15 | 0 | 0 | 0 | 0 | 0 | 0 | 10 | 0 | 0 |
| Avena fatua | 70 | 90 | 50 | 70 | — | — | — | — | 5 | 5 | 5 | 5 | 10 | 85 | 80 | — | — |
| Alopecurus myosuroides | 60 | 85 | 50 | 75 | — | — | — | — | 5 | 5 | 10 | 10 | 15 | 80 | 80 | — | — |
| Galium aparine | 5 | 10 | 30 | 45 | 20 | 45 | 30 | 85 | 35 | 40 | 60 | 70 | 80 | 80 | 90 | 90 | 100 |
| Stellaria media | 10 | 30 | 40 | 65 | 30 | 70 | 30 | 90 | 40 | 60 | 70 | 90 | 90 | 90 | 100 | 100 | 100 |
| Lamium amplexicaule | 5 | 10 | 5 | 10 | 45 | 80 | 30 | 95 | 30 | 40 | 50 | 60 | 70 | 75 | 75 | 100 | 100 |

0 = no damage
100 = complete destruction or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The new compounds may be mixed with fertilizers, insecticides, fungicides and other herbicides.

EXAMPLE 1

The plants wheat (Triticium aestivum), barley (Hordeum vulgare), wild oats (Avena fatua), slender foxtail (Alopecurus myosuroides), catchweed bedstraw (Galium aparine), chickweed (Stellaria media) and henbit (Lamium amplexicaule) were treated at a growth height of 4 to 20 cm with the following amounts of the following individual active ingredients and compositions thereof, each active ingredient and each composition being emulsified or dispersed in 500 liters of water per hectare:

I 4-chlorobutyn-2-yl-1N-3-chlorophenylcarbamate,
  1 and 2 kg per hectare;
II 5-chloro-4-methyl-2-propionamide thiazole,
  2 and 3 kg per hectare;
III 3,5-dibromo-4-hydroxybenzaldoxime-0-(2',4'-dinitrophenyl)-ether, 0.75 and 1.5 kg per hectare;
IV 9-hydroxyfluoroencarboxylic acid-(9),
  1 and 3 kg per hectare;
V 3-isopropyl-2,1,3-benzothiadiazinone-(4)-2,2-dioxide,
  0.75, 1.5, 2 and 3 kg per hectare;
I + V  1.0 + 1.0 kg per hectare;
II + V  2.0 + 1.0 kg per hectare;

EXAMPLE 2

The plants rice (Oryza sativa), soybeans (Soja hispida), Indian corn (Zea mays), wheat (Triticum aestivum), barnyard grass (Echinochloa crus-galli), giant foxtail (Setaria faberii), yellow nutsedge (Cyperus escultentus), common cocklebur (Xanthium pensylvanicum), wild mustard (Sinapis arvensis), waterplantain (Alisma plantago-aquatica), catchweed bedstraw (Galium aparine), chamomile (Matricaria chamomilla), slender foxtail (Alopecurus myosuroides) and annual bluegrass (Poa annua) were treated at a growth height of 4 to 20 cm with the following individual active ingredients and compositions thereof, each active ingredient and each composition being emulsified or dispersed in 500 liters of water per hectare:

I 2,4'-dinitro-4-trifluoromethyldiphenyl ether,
  1.5 and 3 kg per hectare;
II 4'-nitro-2,4,6-trichlorodiphenyl ether,
  2 and 3 kg per hectare;
III N-(1,1-dimethylpropynyl)-3,5-dichlorobenzamide,
  1 and 3 kg per hectare;
IV 2-(2-methyl-4-chlorophenoxy)-N-methoxyacetamide,
  1 and 2 kg per hectare;
V 2,3,6-trichlorobenzoic acid,
  0.5 and 2 kg per hectare;
VI 2-methoxy-3,6-dichlorobenzoic acid,
  1.5 and 2 kg per hectare;
VII 3-isopropyl-2,1,3-benzthiadiazinone-(4)-2,2-dioxide,
  0.5, 1, 1.5, 2 and 3 kg per hectare;
I + VII: 1.5 + 1.5 kg per hectare;
II + VII: 2 + 1 kg per hectare;
III + VII: 1 + 2 kg per hectare;
IV + VII: 1 + 1 kg per hectare;
V + VII: 0.5 + 1.5 kg per hectare;
VI + VII: 1.5 + 0.5 kg per hectare.

After 8 to 14 days it was ascertained that the compositions had a better overall action than the individual active ingredients, combined with good crop plant compatibility. The results are given below:

| Active ingredient kg/ha | I 1.5 | I 3 | II 2 | II 3 | III 1 | III 3 | IV 1 | IV 2 | V 0.5 | V 2 | VI 1.5 | VI 2 | VII 0.5 | VII 1 | VII 1.5 | VII 2 | VII 3 |
|---|---|---|---|---|---|---|---|---|---|---|---|---|---|---|---|---|---|
| Oryza sativa | 10 | 25 | 10 | 20 | — | — | — | — | — | — | — | — | 0 | 0 | 0 | 0 | 0 |
| Soja hispida | 10 | 25 | — | — | 5 | 25 | — | — | — | — | — | — | 0 | 0 | 0 | 5 | 10 |
| Zea mays | — | — | — | — | — | — | 0 | 20 | — | — | — | — | 0 | 0 | 0 | 0 | 0 |

| Active ingredient kg/ha | I | | | II | | | III | | IV | V | | VI | | VII | | |
|---|---|---|---|---|---|---|---|---|---|---|---|---|---|---|---|---|
| | 1.5 | 3 | 2 | 3 | 1 | 3 | 1 | 2 | 0.5 | 2 | 1.5 | 2 | 0.5 | 1.5 | 2 | 3 |
| Triticum aestivum | — | — | — | — | — | — | — | — | 0 | 20 | 10 | 15 | 0 | 0 | 0 | 0 |
| Echinochloa crus-galli | 65 | 95 | 60 | 90 | 40 | 80 | 40 | 70 | — | — | — | — | 0 | 5 | 5 | 10 |
| Setaria faberii | 65 | 90 | 60 | 90 | 35 | 70 | 45 | 75 | — | — | — | — | 5 | 5 | 10 | 15 |
| Cyperus esculentus | 45 | 80 | 30 | 55 | 20 | 55 | 5 | 10 | — | — | — | — | 20 | 36 | 45 | 65 |
| Xanthium pensylvanicum | 30 | 65 | 30 | 45 | 25 | 60 | 30 | 55 | — | — | — | — | 30 | 40 | 60 | 70 |
| Sinapis arvensis | 60 | 95 | 40 | 60 | 60 | 95 | 45 | 90 | — | — | — | — | 45 | 60 | 75 | 95 |
| Alisma plantago-aquatica | 30 | 50 | 15 | 30 | 20 | 55 | 20 | 45 | — | — | — | — | 20 | 40 | 60 | 75 |
| Galium aparine | — | — | — | — | — | — | — | — | 25 | 85 | 60 | 85 | 30 | 40 | 60 | 70 |
| Matricaria chamomilla | — | — | — | — | — | — | — | — | 30 | 95 | 65 | 90 | 35 | 50 | 60 | 90 |
| Alopecurus myosuroides | — | — | — | — | — | — | — | — | 50 | 95 | 45 | 80 | 5 | 5 | 15 | 10 |
| Poa annua | — | — | — | — | — | — | — | — | 55 | 100 | 60 | 95 | 5 | 5 | 5 | 10 |

0 = no damage
100 complete destruction

| Active ingredient kg/ha | I + VII | II + VII | III + VII | IV + VII | V + VII | VI + VII |
|---|---|---|---|---|---|---|
| | 2.5 + 1.5 | 2 + 1 | 1 + 2 | 1 + 1 | 0.5 + 1.5 | 1.5 + 0.5 |
| Oryza sativa | 10 | 10 | — | — | — | — |
| Soja hispida | 10 | — | 5 | — | — | — |
| Zea mays | 0 | — | — | — | — | — |
| Triticum aestivum | — | — | — | — | 0 | 10 |
| Echinochloa crus-galli | 90 | 90 | 80 | 70 | — | — |
| Setaria faberii | 90 | 85 | 75 | 75 | — | — |
| Cyperus esculentus | 100 | 95 | 100 | 100 | — | — |
| Xanthium pensylvanicum | 100 | 100 | 100 | 100 | — | — |
| Sinapis arvensis | 100 | 100 | 100 | 100 | — | — |
| Alisma plantago-aquatica | 100 | 90 | 100 | 100 | — | — |
| Galium aparine | — | — | — | — | 100 | 95 |
| Matricaria chamomilla | — | — | — | — | 100 | 95 |
| Alopecurus myosuroides | — | — | — | — | 80 | 75 |
| Poa annua | — | — | — | — | 80 | 80 |

0 = no damage
100 = complete destruction

EXAMPLE 3

In the open the crop plant soybeans (*Soja hispida*) and Indian corn (*Zea mays*) and the unwanted plants barnyard grass (*Echinochloa crus-galli*), giant foxtail (*Setaria faberii*), yellow nutsedge (*Cyperus esculentus*), wild mustard (*Sinapis arvensis*), common cocklebur (*Xanthium pensylvanicum*), catchweed bedstraw (*Galium aparine*), chamomile (*Matricaria chamomilla*), perennial ryegrass (*Lolium perenne*) and bluegrass (*Poa trivialis*) are treated postemergence with the following individual active ingredients and composition thereof:

I  3-isopropyl-2,1,3-benzothiadiazinon-(4)-2,2-dioxide,
0.7 and 2 kg per hectare;

II 3-amino-2,5-dichlorobenzoic acid,
1.3 and 2 kg per hectare;

I + II 0.7 + 1.3 kg per hectare.

After 10 to 14 days it was ascertained that the composition I + II had better crop plant compatibility and a better herbicidal action than its individual components I and II.

The results are given below:

| Active ingredient kg/ha | I | | II | | I + II |
|---|---|---|---|---|---|
| | 0.7 | 2 | 1.3 | 2 | 0.7 + 1.3 |
| Soja hispida | 0 | 10 | 0 | 15 | 10 |
| Zea mays | 0 | 10 | 0 | 15 | 10 |
| Echinochloa crus-galli | 10 | 10 | 50 | 80 | 85 |
| Setaria faberii | 15 | 20 | 45 | 90 | 90 |
| Cyperus esculentus | 40 | 75 | 10 | 10 | 90 |
| Sinapis arvensis | 40 | 80 | 20 | 30 | 100 |
| Xanthium pensylvanicum | 50 | 90 | 10 | 10 | 100 |
| Galium aparine | 45 | 80 | 10 | 10 | 85 |
| Matricaria chamomilla | 50 | 80 | 5 | 10 | 95 |
| Lolium perenne | 0 | 0 | 40 | 70 | 70 |
| Poa trivialis | 0 | 0 | 50 | 80 | 90 |

0 = no damage
100 = complete destruction

EXAMPLE 4

In the open the crop plants wheat (*Triticum aestivum*), barley (*Hordeum vulgare*), rye (*Secale cereale*) and lawn grass, and the unwanted plants wild mustard (*Sinapis arvensis*), hempnettle (*Galeopsis tetrahit*), catchweed bedstraw (*Galium aparine*), kochia (*Kochia scoparia*), red deadnettle (*Lamium purpureum*), gromwell (*Lithospermum officinale*), chamomile (*Matricaria chamomilla*), redroot pigweed (*Amaranthus retroflexus*) and common cocklebur (*Xanthium pensylvanicum*) are treated postemergence with the following amounts of the following individual active ingredients and compositions thereof:

I 3,5-dibromo-4-hydroxybenzonitrile, 0.4 kg per hectare;

II 3,5-diiodo-4-hydroxybenzonitrile, 0.3 kg per hectare;

III 3,5-dibromo-4-octanoyloxybenzonitrile, 0.5 kg per hectare;

IV 3-isopropyl-2,1,3-benzothiadiazinone-4)-2,2-dioxide, 0.5 kg per hectare;

I + IV: 0.4 + 0.5 kg per hectare;
II + IV: 0.3 + 0.5 kg per hectare;
III + IV: 0.3 + 0.5 kg per hectare;

After 10 to 14 days it was ascertained that the compositions had a better herbicidal action than their individual components, combined with the same good crop plant compatibility.

The results are given below:

| Active ingredient kg/ha | I 0.4 | II 0.3 | III 0.5 | IV 0.5 | I + IV 0.4 + 0.5 | II + IV 0.3 + 0.5 | III + IV 0.5 + 0.5 |
|---|---|---|---|---|---|---|---|
| Triticum aestivum | 5 | 10 | 0 | 0 | 0 | 5 | 0 |
| Hordeum vulgare | 0 | 5 | 0 | 0 | 0 | 0 | 0 |
| Secale cereale | 0 | 5 | 0 | 0 | 0 | 0 | 0 |
| lawn grass | 0 | 0 | 0 | 0 | 0 | 0 | 0 |
| Sinapis arvensis | 30 | 35 | 15 | 25 | 80 | 90 | 70 |
| Galeopsis tetrahit | 25 | 30 | 20 | 25 | 75 | 85 | 75 |
| Galium aparine | 20 | 30 | 15 | 35 | 90 | 100 | 85 |
| Kochia scoparia | 25 | 25 | 15 | 20 | 70 | 80 | 80 |
| Lamium purpureum | 30 | 40 | 25 | 10 | 80 | 90 | 90 |
| Lithospermum officinale | 25 | 30 | 20 | 25 | 75 | 90 | 85 |
| Matricaria chamomilla | 20 | 30 | 20 | 35 | 80 | 100 | 75 |
| Amaranthus retroflexus | 30 | 35 | 25 | 30 | 90 | 100 | 95 |
| Xanthium pensylvanicum | 20 | 25 | 20 | 40 | 85 | 95 | 90 |

0 = no damage
100 = complete destruction

EXAMPLE 5

On a plot of open land with apple, peach and pear trees growing on it the unwanted plants green foxtail (*Setaria viridis*), yellow foxtail (*Setaria glauca*), giant foxtail (*Setaria faberii*), barnyard grass (*Echinochloa crus-galli*), yellow nutsedge (*Cyperus esculentus*), purple nutsedge (*Cyperus rotundus*), wild mustard (*Sinapis arvensis*), chamomile (*Matricaria chamomilla*), common purslane (*Portulaca oleracea*), redroot pigweed (*Amaranthus retroflexus*) and annual bluegrass (*Poa annua*) are treated with the following amounts of the following active ingredients and composition thereof:

I 2,6-dichlorobenzonitrile, 0.5 kg per hectare;
II 3-isopropyl-2,1,3-benzothiadiazinone-(4)-2,2-dioxide, 0.5 kg per hectare;
I + II: 0.5 + 0.5 kg per hectare;

After 10 to 14 days it was ascertained that the composition had better compatibility with the fruit trees and a better herbicidal action than its individual components.

The results are given below:

| Active ingredient | I | II | I + II |
|---|---|---|---|
| kg/ha | 0.5 | 0.5 | 0.5 + 0.5 |
| apple trees | 0 | 0 | 0 |
| peach trees | 5 | 0 | 0 |
| pear trees | 0 | 0 | 0 |
| Setaria viridis | 40 | 5 | 75 |
| Setaria glauca | 45 | 0 | 80 |
| Setaria faberii | 35 | 5 | 90 |
| Echinochloa crus-galli | 45 | 5 | 100 |
| Cyperus esculentus | 40 | 30 | 100 |
| Cyperus rotundus | 35 | 25 | 90 |
| Sinapis arvensis | 40 | 40 | 100 |
| Matricaria chamomilla | 35 | 40 | 100 |
| Portulaca oleracea | 40 | 30 | 90 |
| Amaranthus retroflexus | 35 | 30 | 85 |
| Poa annua | 45 | 0 | 80 |

0 = no damage
100 = complete destruction

EXAMPLE 6

In the greenhouse the plants and the soil are treated prior to the emergence of beet (*Beta vulgaris*) and potatoes (*Solanum tuberosum*) and after the emergence of wheat (*Triticum aestivum*) and the unwanted plants green foxtail (*Setaria viridis*), giant foxtail (*Setaria faberii*), barnyard grass (*Echinochloa crus-galli*), slender foxtail (*Alopecurus myosuroides*), silky bent grass (*Apera spica venti*), perennial ryegrass (*Lolium perenne*), bluegrass (*Poa trivialis*), catchweed bedstraw (*Galium aparine*), wild mustard (*Sinapis arvensis*), chamomile (*Matricaria chamomilla*) and common lambsquarters (*Chenopodium album*) are treated with the following amounts of the following individual active ingredients and compositions thereof:

I 1,1'-dimethyl-4,4'-dipyridilium-di-(methyl sulfate) 0.3 kg per hectare;

II 1,1'-di-(3,5-dimethylmorpholinecarbonylmethyl)-4,4'-dipyridilium dichloride, 0.5 kg per hectare;

III 1,1'-ethylene-2,2'-dipyridilium dibromide, 0.3 kg per hectare;

IV 3-isopropyl-2,1,3-benzothiadiazinone-(4)-2,2-dioxide, 0.5 kg per hectare;

I + IV: 0.3 + 0.5 kg per hectare;
II + IV: 0.5 + 0.5 kg per hectare;
III + IV: 0.3 + 0.5 kg per hectare.

After 10 to 14 days it was ascertained that the compositions had a better herbicidal action than their individual components, combined with the same good crop plant compatibility.

The results are given below:

| Active ingredient | I | II | III | IV | I + IV | II + IV | III + IV |
|---|---|---|---|---|---|---|---|
| kg/ha | 0.3 | 0.5 | 0.3 | 0.5 | 0.3 + 0.5 | 0.5 + 0.5 | 0.3 + 0.5 |
| *Beta vulgaris* | 10 | 0 | 0 | 0 | 0 | 0 | 0 |
| *Solanum tuberosum* | 0 | 0 | 0 | 0 | 0 | 0 | 0 |
| *Triticum aestivum* | — | 10 | — | 0 | — | 5 | 5 |
| *Setaria viridis* | 40 | 25 | 30 | 5 | 90 | 80 | 85 |
| *Setaria faberii* | 40 | 30 | 35 | 5 | 95 | 80 | 85 |
| *Echinochloa crus-galli* | 35 | 25 | 30 | 0 | 85 | 75 | 80 |
| *Alopecurus myosuroides* | 40 | 30 | 35 | 5 | 80 | 70 | 75 |
| *Apera spica venti* | 50 | 40 | 45 | 10 | 100 | 90 | 95 |
| *Lolium perenne* | 35 | 25 | 30 | 0 | 80 | 70 | 70 |
| *Poa trivialis* | 40 | 30 | 35 | 5 | 85 | 75 | 80 |
| *Galium aparine* | 35 | 30 | 30 | 35 | 90 | 80 | 80 |
| *Matricaria chamomilla* | 40 | 35 | 35 | 35 | 95 | 80 | 85 |
| *Sinapis arvensis* | 45 | 40 | 45 | 40 | 100 | 100 | 100 |
| *Chemopodium album* | 45 | 40 | 40 | 45 | 100 | 100 | 100 |

0 = no damage
100 = complete destruction

The action of the following compositions corresponds to that of those above:
3-isopropyl-2,1,3-benzothiadiazinone-(4)-2,2-dioxide with methyl-N-(4-aminobenzenesulfonyl)-carbamate,
2-methoxy-3,5,6-trichlorobenzoic acid,
O,S-dimethyltetrachlorothioterephthalate, or 4'-nitro-2,4-dichlorodiphenyl ether.

I claim:

1. A herbicidal composition consisting essentially of an inert carrier containing a herbicidally effective amount of a mixture of a. a compound of the formula

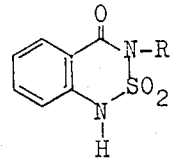

where R denotes lower alkyl of a maximum of 4 carbon atoms, or an alkali metal, ammonium, hydroxyalkylammonium, alkylammonium or hydroxy alkylalkyl ammonium salt thereof, and b. 2,6-dichlorobenzonitrile in a weight ratio of *a* to *b* in the range of 5:1 to 1:5.

2. A herbicide composition as claimed in claim 1 wherein compound a is 3-isopropyl-2,1,3-benzothiadiazinone-(4)-2,2-dioxide.

3. A herbicide composition as claimed in claim 1 wherein the weight ratio of *a* to *b* is 3:1 to 1:3.

4. A herbicide composition as claimed in claim 2 wherein the weight ratio of *a* to *b* is 1:1.

* * * * *

UNITED STATES PATENT OFFICE
CERTIFICATE OF CORRECTION

PATENT NO. : 3,888,655
DATED : June 10, 1975
INVENTOR(S) : Adolf Fischer

It is certified that error appears in the above-identified patent and that said Letters Patent are hereby corrected as shown below:

In Column 3, Line 3, delete "form" and substitute --from--

In Column 3, Line 6, delete "as" and substitute --or--

In Column 6, Example 3 (Composition I), delete "benzothiadiazinon" and substitute --benzothiadiazinone--

Signed and Sealed this eighth Day of June 1976

[SEAL]

Attest:

RUTH C. MASON
Attesting Officer

C. MARSHALL DANN
Commissioner of Patents and Trademarks